Jan. 16, 1951  H. R. BERGLUND  2,537,957
ARTICLE SUSPENDING SUPPORT
Filed Oct. 13, 1947

HAROLD R. BERGLUND
INVENTOR.

BY
*H. A. McGrew*
ATTORNEY

Patented Jan. 16, 1951

2,537,957

UNITED STATES PATENT OFFICE 2,537,957

ARTICLE SUSPENDING SUPPORT

Harold R. Berglund, Denver, Colo., assignor to Denver Wood Products Co., Denver, Colo., a firm Application October 13, 1947, Serial No. 779,446

5 Claims. (Cl. 248—303)

This invention relates to racks or supports for suspending articles for display and the like, and particularly to such supports having readily detachable parts.

It is desirable that racks or supports which may be required to support different articles at various times be provided with some arrangement for changing the spacing or size of the supporting elements. For example, when display racks are employed to hold a complete line of articles of different sizes or shapes, such as replacement parts for various makes of automobiles, it is desirable that the supporting elements or brackets be readily adaptable to accommodate the articles to be displayed. Thus, it is desirable to be able from time to time to change the number, size, and position of the brackets on the rack. Accordingly, it is an object of this invention to provide an article support having a base and an article supporting bracket including an improved arrangement for affording ready detachment of the bracket from the base.

Further objects and advantages of this invention will become apparent as the following description proceeds, and the features of novelty which characterize the invention will be pointed out with particularity in the claims annexed to and forming a part of this specification.

For a better understanding of the invention, reference may be had to the accompanying drawing, in which:

Fig. 5 is a bottom elevation view of the clip shown in Fig. 4.

Figure 1:
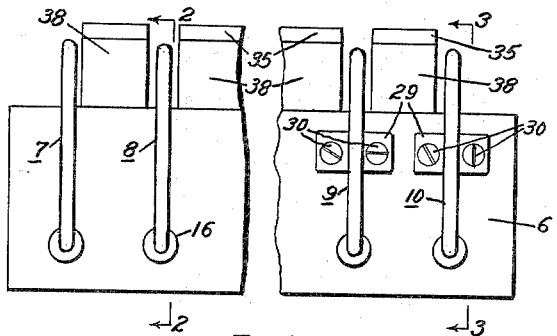
Fig. 1 is a front elevation view partly broken away of an article supporting rack embodying the invention.
Figure 2:
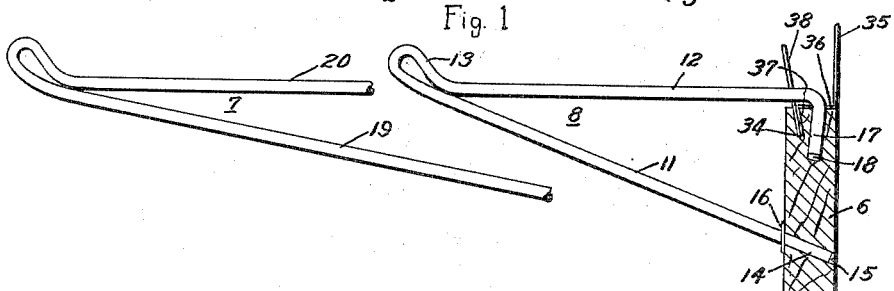
Fig. 2 is a sectional view along the line 2—2 of Fig. 1.

Referring now to the drawing, there is illustrated in Fig. 1 a support or rack suitable for holding articles displayed for sale; for example, the rack might be employed to display a line of automobile fan belts. The rack comprises a base 6, which may be made of wood, and a plurality of brackets 7, 8, 9 and 10, any desired number of which may be employed. For purposes of illustration, the brackets have been shown of different sizes and types, although it is obvious that they may all be of the same size and type if desired. As shown in Fig. 2, the bracket 7 is longer than the bracket 8, both being of the same type; part of the bracket 7 has been shown broken away in order to avoid confusion in the drawing. The bracket 8 comprises a length of resilient wire bent to provide diverging arms 11 and 12 connected by a loop or hook 13. The arm 11 is substantially straight and has its end 14 seated in a socket 15 drilled in the base 6. A stop 16 is provided on the arm 11 to limit the position of the end 14 in the socket 15, the stop being in the form of a washer crimped or otherwise suitably retained on the arm 11. The arm 12 extends over the top of the base 6 and has its end 17 bent downwardly at about right angles toward the arm 11 so that the axes of the ends 14 and 17 extend transversely of one another. The end 17 is seated in a socket 18 drilled in the top of the base 6. In order to hold the bracket securely in position on the base, the arms 11 and 12 are formed so that they diverge normally at an acute angle substantially smaller than that between them in their positions on the base. Thus, pressure is exerted between the ends, due to the resilience of the wire, and the end 17 is securely retained in the socket 18. When it is desired to detach the bracket 8 from the base 6, the arm 12 is lifted to spread the arms apart and move the end 17 out of the socket 18 so that the end 14 of the arm 11 may be drawn out of the socket 15. The bracket is attached to the base by reversing this operation. The angle between the end 17 and the arm 12 is selected so that the end may be pressed into the socket 18 when the stop 16 is in contact with the base 6; that is, when the end 14 is properly seated in the socket 15. The sockets fit closely about the respective ends of the bracket and hold the bracket securely in position.

The bracket 7 is of the same construction as the bracket 8 except for the length of its arms indicated at 19 and 20.

Figure 3:
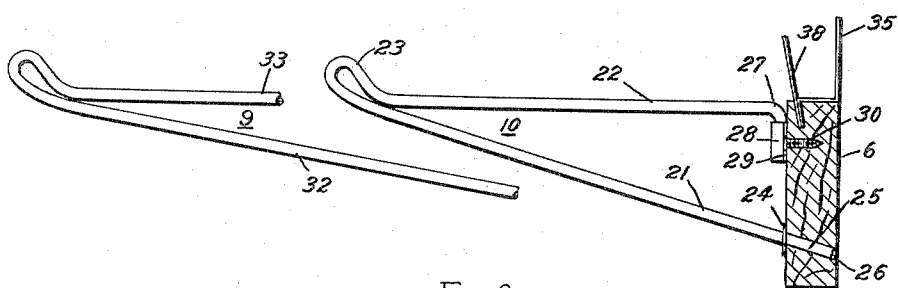
Fig. 3 is a sectional view along the line 3—3 of Fig. 1.

As shown in Fig. 3, the brackets 9 and 10 are constructed similar to the brackets 7 and 8. The bracket 9 has been shown broken away in a manner similar to the bracket 7 and the construction of the brackets 9 and 10 is illustrated by the bracket 10 which is shown in full. This bracket comprises a length of resilient wire bent to provide divergent arms 21 and 22 connected by a hook or loop 23. The arm 21 is provided with a stop 24 similar to the stop 16 and which limits the position of the end 25 of the arm in a socket 26 drilled in the base 6. The arm 22 has its end 27 bent downwardly, similar to the end 17 of the arm 16, and seated in a socket 28 formed in a clip 29 which is secured by screws 30 to the front of the base 6. The normal angle between the arms 21 and 22 is smaller than that when the bracket is in position, so that the resilience of the wire holds the bracket securely on the base in the same manner as in the case of the bracket 8.

Figure 4:
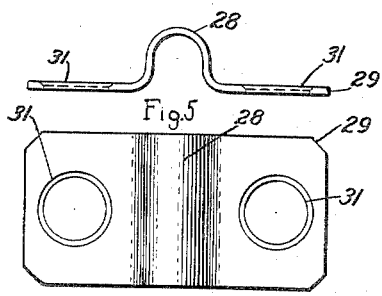
Fig. 4 is an enlarged view of a detail of a socket clip of the rack of Fig. 1.

The details of construction of the clip 29 are clearly shown in Figs. 4 and 5. The socket 28 is formed as a V-shaped bend in the clip and holes 31 are provided to receive the screws 30.

The bracket 9 is of the same construction as the bracket 10 except that its arms 32 and 33 are longer than the arms 21 and 22.

A longitudinal groove 34 is provided along the top of the base 6 near the front edge and sloping slightly toward the front. A metal angle strip 35 is mounted on the base 6 and is formed to provide one portion extending upwardly in alignment with the rear of the base 6 and suitable for a sign or decoration on the rack. Another part 36 of the strip 35 lies flat along the top of the base and a foot 37 is fitted into the groove 34 to lock the strip in position. The groove may also be made wide enough to receive price tags or similar cards 38 which thus stand upright between the adjacent brackets.

It will thus be apparent that a rack has been provided which is particularly suited for the display of articles of various sizes and shapes and which may require changing or shifting of the positions of the individual brackets. Each bracket is of simple and rugged construction and may readily be detached, but when in position on the base is securely held and is suitable for supporting substantial weight.

Various other forms will occur to those skilled in the art and it is intended by the appended claims to cover all modifications which fall within the spirit and scope of the invention.

Having thus described the invention, what is claimed is:

1. An article support comprising a base and a detachable wire bracket arranged to extend therefrom, said bracket comprising a length of resilient wire bent to provide two divergent arms, one of said arms having a substantially straight end and the end of the other arm being bent toward said one arm, means providing sockets on said base having longitudinal axes positioned to correspond to the axes of the ends of said arms and spaced apart a greater distance than the normal spacing of said ends whereby said arms may be sprung apart from their normal position and the end of said one arm inserted in the corresponding one of said sockets and the end of said other arm then released to enter its corresponding socket, said ends being retained in said sockets by the resilience of said arms, and a stop on said one arm for limiting the position of the end of said arm in its corresponding one of said sockets.

2. An article support comprising a base and a detachable wire bracket extending laterally therefrom, said bracket comprising a resilient wire bent to provide two divergent arms, the first of said arms having a straight end and the second having its end bent toward said first arm, means providing sockets on said base retaining said ends of said arms, said wire being initially formed with said arms at an angle less than their angle when assembled on said base, whereby said ends are retained in said sockets by the resilience of said arms and may be released by first spreading said arms to move said bent end out of its socket and then removing said first arm from its socket.

3. A detachable bracket comprising a length of resilient wire having an intermediate portion bent into a loop and forming upper and lower arms diverging outwardly from said loop, said upper arm having a downwardly bent end portion at substantially right angles to said arm, and said lower arm having a substantially straight end portion and a stop on said end portion spaced from the outer extremity thereof, said end portions being adapted to be inserted in a vertical socket and a socket downwardly inclined to the horizontal in a supporting member.

4. An article support comprising a base having a vertical socket extending downwardly from the upper surface and a socket inclined downwardly from the horizontal extending inwardly from one side surface, a bracket comprising a length of resilient wire having an intermediate portion bent into a loop and forming upper and lower arms diverging outwardly from said loop, said upper arm having a downwardly bent end portion extending into said vertical socket, said lower arm having a substantially straight end portion extending into said inclined socket, and a stop on said end portion spaced from the outer extremity thereof, and adapted to limit the movement of said lower arm into said inclined socket.

5. An article support comprising a base having a U-shaped clip secured to one side surface and forming a vertical socket, said base also having a socket inclined downwardly from the horizontal and extending inwardly from said one side surface below said clip, a bracket comprising a length of resilient wire having an intermediate portion bent into a loop and forming upper and lower arms diverging outwardly from said loop, said upper arm having a downwardly bent end portion extending into said vertical socket, said lower arm having a substantially straight end portion extending into said inclined socket, and a stop on said end portion spaced from the outer extremity thereof and adapted to limit the movement of said lower arm into said inclined socket.

HAROLD R. BERGLUND.

REFERENCES CITED

The following references are of record in the file of this patent:

UNITED STATES PATENTS

| Number | Name | Date |
| --- | --- | --- |
| 1,465,659 | Wheeler | Aug. 21, 1923 |
| 2,291,178 | Vanderwerp | July 28, 1942 |